United States Patent
McIlvaine

[11] 3,738,624
[45] June 12, 1973

[54] GAS SCRUBBER
[75] Inventor: Robert L. McIlvaine, Glencoe, Ill.
[73] Assignee: Environeering, Inc., Skokie, Ill.
[22] Filed: Oct. 26, 1971
[21] Appl. No.: 192,489

[52] U.S. Cl................. 261/44 R, 261/81, 261/109, 261/111, 55/226, 55/233
[51] Int. Cl............................................. B01d 47/06
[58] Field of Search........................... 55/233, 226; 261/DIG. 54, 44, 96, 109, 111, 112, 81

[56] References Cited
UNITED STATES PATENTS
3,592,452  7/1971  Katyal................................ 261/109

*Primary Examiner*—Tim R. Miles
*Assistant Examiner*—Steven H. Markowitz
*Attorney*—Richard D. Mason, M. Hudson Rathburn, Philip C. Peterson et al.

[57] ABSTRACT

A gas scrubber for removing contaminants from gas including constricting flow passage means for said gas, a plurality of elongated filter elements in parallel extended transversely across said flow passage means and defining therebetween a plurality of smaller, separate, discrete flow paths for high velocity gas flow. The first set of said elements is mounted in fixed relation relative to said flow passage and a second set of elements comprising alternate ones between adjacent elements in said first set is supported for movement relative to said elements in the first set to vary the size of said discrete flow paths therebetween. Means is provided for adjusting and holding the relative position of the elements in the first and second sets, thereby defining a selected total flow area for accommodating a given rate of gas flow.

12 Claims, 5 Drawing Figures

PATENTED JUN 12 1973

INVENTOR:
ROBERT L. McILVAINE
BY
Mason, Kolehmainen, Rathburn & Wyss
ATT'YS

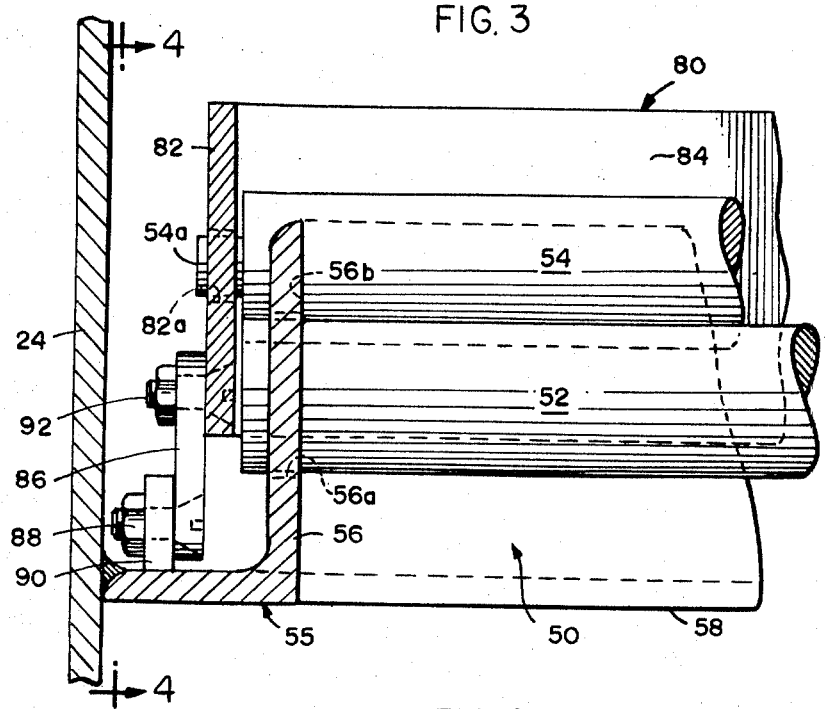
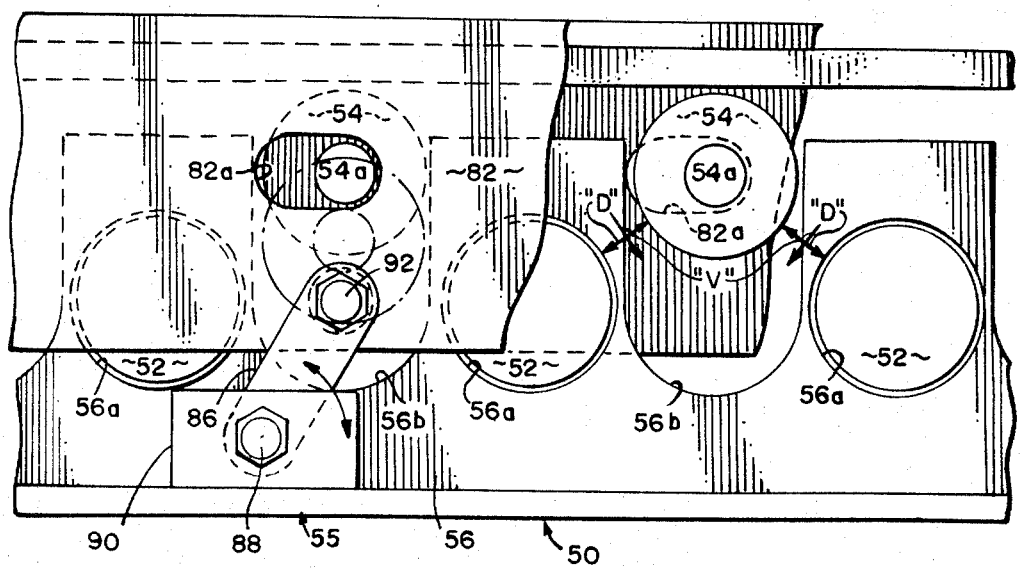

GAS SCRUBBER

This invention relates to gas scrubbers and, more particularly, to gas scrubbers of the general type shown and described in the U. S. Pat. No. 3,544,087, dated Dec. 1, 1970. The present invention comprises an improvement on the gas scrubber of the copending U. S. Pat. application, Ser. No. 91,854, filed Nov. 23, 1970; said patent and said copending application both being assigned to the predecessor in interest of the assignee of the present application.

In wet-type gas scrubbers of the character described in the aforementioned patent and copending patent application, there is provided a flow constricting passageway having a plurality of elongated grid rods or elements therein between which grids the gas velocity is increased substantially to a maximum value. Scrubbing liquid is introduced into the region of highest velocity gas flow and intense turbulence and mixing action results wherein the contaminants in the gas are agglomerated and collect in the scrubbing liquid, which liquid is later removed from the gas flow. Because the load or volume flow rate of gas delivered to a gas scrubber in most commercial installations may fluctuate and vary widely between periods of peak production and other periods of lower production rate, it is desirable to provide means for adjusting the effective flow area in the flow constricting passage of a scrubber in order to provide for a relatively constant scrubbing velocity even though the volume flow rate of input gas varies. In the aforementioned United States patent, adjustment of the flow area of the scrubber is in response to the flow pressure or buoyancy of the gas coming through the scrubber, while in the aforementioned copending patent application, the effective flow area is adjusted by increasing or decreasing the number of rods positioned in the path of the gas and, correspondingly, the number of flow passages therebetween is variable.

The present invention comprises an improvement on the foregoing scrubbers in that the effective cross-sectional flow area is varied and adjusted as desired to maintain a relatively constant pressure drop or maximum velocity through the flow constricting passages and, once the desired pressure drop or veloctiy range is obtained, the selected flow area is maintained constant until such time as it is desired to positively change to another selected spacing value. This arrangement overcomes the problem of response to transient variations in volume of gas input.

It is therefore an object of the present invention to provide a new and improved gas scrubber of the character described.

More particularly, it is an object of the present invention to provide a new and improved gas scrubber with adjustable flow constricting means for accelerating the gas to a desired velocity range, which means is operative to vary the flow area presented to the gas to accommodate changes in volume of gas input.

Another object of the present invention is to provide a new and improved gas scrubber of the character described which is easily adjusted to control the effective cross-sectional flow area presented to the gas.

Another object of the present invention is to provide an adjustable flow constricting device for a gas scrubber of the character described including means for positively positioning and maintaining the effective cross-sectional flow area presented to the gas.

Another object of the invention is to provide a gas scrubber capable of handling variable gas volume inputs in an efficient manner, yet relatively unresponsive to momentary transient variations in volume input.

These and other objects and advantages of the present invention are accomplished in an illustrated embodiment which comprises a new and improved gas scrubber for eliminating contaminants from industrial gas, and the like, including a constrictive flow passage therein for accelerating the gas to a desired velocity range as it is wetted with a contaminant-collecting scrubbing liquor. A plurality of elongated filter elements or grids arranged in parallel are extended transversely across the flow passage, and the grids define a number of separate discrete flow paths of reduced cross-sectional area providing high velocity gas flow between adjacent grids.

A first set of the elements is mounted in fixed relation to the flow passage, and a second set comprises alternate elements between adjacent elements in the first set. The elements in the second set are supported for movement toward and away from one another to provide adjustable spacing to regulate the effective cross-sectional flow area presented to the gas flowing between the sets of elements. Holding means is provided for adjustably positioning the elements in the second set relative to those of the first set of elements. After a desired spacing between elements is selected, the holding means positively maintains this selected spacing during operation of the scrubber until it is changed.

For a better understanding of the present invention, reference should be had to the following detailed description taken in conjunction with the drawings, in which:

FIG. 3 is a fragmentary, enlarged, vertical, cross-sectional view taken substantially along line 3—3 of FIG. 2;

FIG. 4 is a large fragmentary, vertical, sectional view taken substantially along line 4—4 of FIG. 3.

Figure 1:
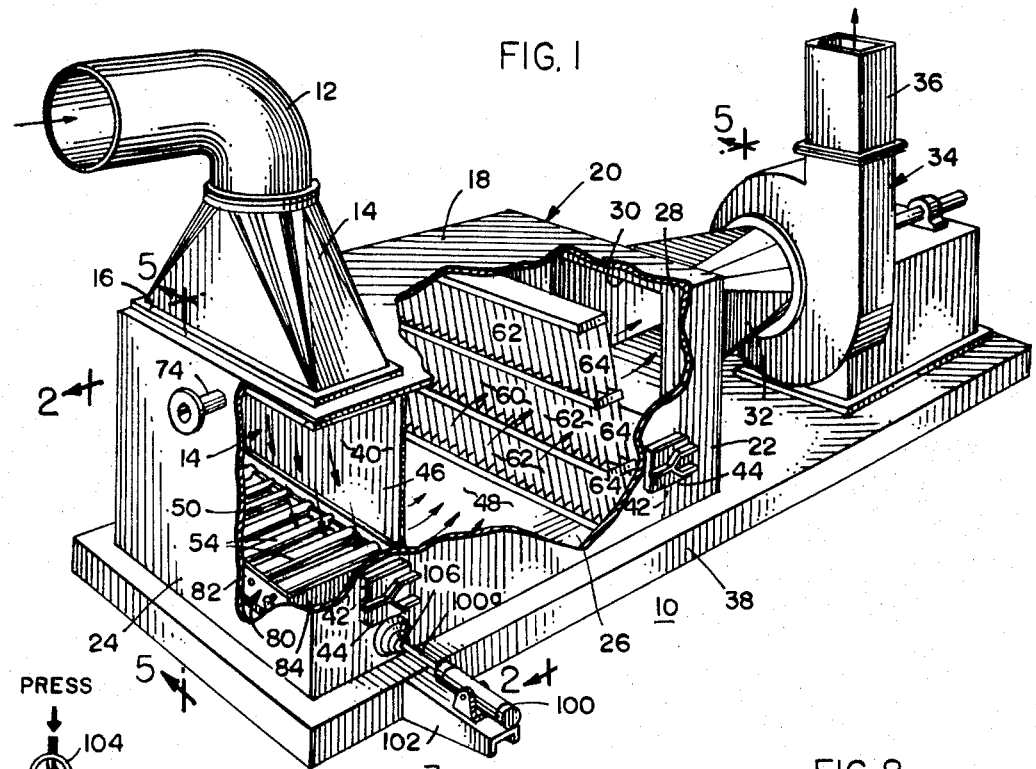
FIG. 1 is a perspective view of a new and improved gas scrubber constructed in accordance with the features of the present invention.

Referring now, more particularly, to the drawings, therein is illustrated a new and improved gas scrubber 10 constructed in accordance with the features of the present invention. The scrubber 10 is especially adapted for the highly efficient removal of small-sized gas contaminants, particulate matter, fumes and the like from industrial gases. The contaminated gas to be cleaned is introduced into the scrubber through an inlet duct elbow 12 for downward flow through an enlarging transition section 14 into a flanged inlet opening 16 formed in the top wall 18 of a generally boxlike, rectangular scrubber housing indicated by the reference numeral 20.

Figure 5:
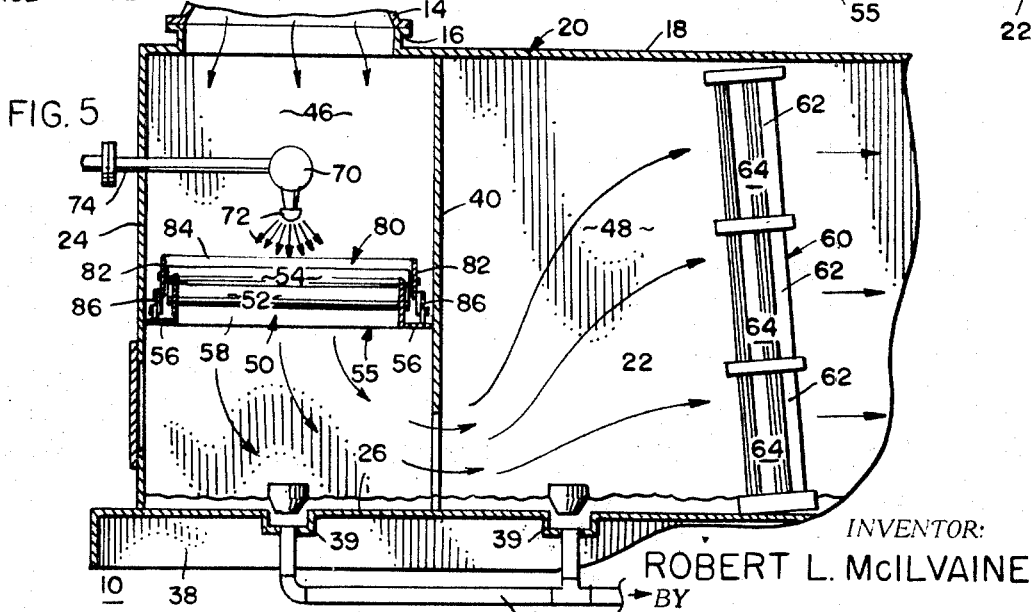
FIG. 5 is a fragmentary, vertical, cross-sectional view taken substantially along line 5—5 of FIG. 1.

The scrubber housing 20 is generally rectangular in shape, as shown, and includes a pair of vertical, spaced, parallel, opposite sidewalls 22, a front end wall 24, a bottom wall 26, and a rear end wall 28. The cleansed gas exits the rear end of the scrubber housing through an enlarged opening 30 formed in the rear wall and passes through a transition duct 32 to an axial inlet opening on one side of a discharge blower 34 driven by an electric motor, or other power source not shown. The output of the blower is delivered to an exhaust stack, or the like, via a connecting exhaust duct 36 in communication with the discharge outlet of the blower housing. It is to be understood that the blower 34 could be utilized on the inlet side of the scrubber system to move the gases through the inlet duct 12 and scrubber housing 20. Preferably, the scrubber housing and the blower are mounted on a single large rectangular base 38 which, as shown, may be formed of reinforced concrete or other suitable structural support material. As shown in FIG. 5, scrubbing liquid from the bottom sump portion of the scrubber housing is removed via float controlled or suitably valved drain outlets 39 connected to a drain line 41 leading to a sump or settlement chamber (not shown) wherein the sludge is drained off so the liquid can be reused. The float or valve controlled drains 39 prevent the loss of gas into the drain system by insuring that enough liquid is maintained in the bottom of the scrubber housing to provide a liquid seal. In order to provide access to the interior of the scrubber housing for maintenance and cleaning, the sidewalls are provided with one or more access openings 42, and these openings are normally sealed by pivotal doors or suitable hatch-type closure members 44, as shown in FIG. 1.

According to the present invention, the scrubber 10 is especially adapted for use in applications wherein the volume flow rate input of contaminated gas delivered to the scrubber may vary widely from day-to-day, week-to-week, or even on an hour-to-hour basis. In order to operate efficiently at several different volume flow rate inputs and yet maintain a selected scrubbing velocity range, the scrubber 10 includes an adjustable flow constricting device indicated generally by the numeral 50. The flow constricting assembly is capable of selective adjustment of the effective minimal cross-sectional flow area presented to the gas in the turbulent wet scrubbing region of intensive activity as the gas moves through the scrubber housing. In order to achieve uniform cleansing action in the scrubber, it is desirable to maintain a relatively constant range of gas velocity through the flow constrictor regardless of the input rate of the gas. Adjustment of the effective flow area to achieve a desired scrubbing velocity may be varied in order to remove contaminant particles down to a particular size or quantity level; for example, if it has been found that an average gas velocity of 2,000 feet per minute through the flow constricting section 50 is sufficient to remove particles of a particular size range to meet code standards, then an operating parameter is established for the particular class or type of contaminants in the gas, and even though the volume flow rate input through the scrubber housing may vary from time to time, the effective flow area may be adjusted to achieve a relatively stable or constant velocity range so that adequate scrubbing action is always obtained. Unlike the prior scrubbers, the section 50 does not respond to momentary transiet variations in gas input but is stable to provide a constant range of velocity even though fluctuation in input may occur.

In accordance with the present invention, the scrubber housing 20 is provided with a vertical divider wall or plate 40 spaced apart and parallel of the front wall 24. The divider has a lower edge terminating short of the housing bottom wall 26 in order to permit the gas to flow underneath (as best shown in FIG. 5) between an inlet chamber 46 in communication with the incoming gases delivered through the opening 16. The gas flows downwardly through the flow constricting assembly means 50 and then turns sharply horizontal under the lower edge of the divider wall 40 and passes into an enlarged intermediate chamber 48 wherein the gas decelerates in velocity and stabilizes with a substantially horizontal flow direction.

In order to remove any moisture in the gas which does not gravitate out during the abrupt directional change, as described, when the gas passes under the lower edge of the divider plate, an upstanding bank or assembly 60 of Z-shaped demisting vanes 64 is provided between the divider plate and the opening 30 in the rear wall 28 of the housing. As the gases pass through the Z-shaped demisting vanes 64 which are sloped slightly with respect to the vertical (as shown in FIG. 5) to drain the liquid toward the drains 39, the liquid droplets in the gas impinge upon the vane surfaces and flow downwardly into the sump area. As illustrated, the vane assembly 60 comprises a plurality of rows 62 of the vanes 64 stacked vertically, one upon the other, and each row is made up of an array of individual Z-shaped vanes in parallel array. As the gas flows horizontally through and between the vanes, it undergoes abrupt and sharp directional changes, and the remaining moisture droplets impinge and collect on the vane surfaces.

In accordance with the invention, the incoming gas to be cleaned is wetted and scrubbed with liquid in order to agglomerate and collect the contaminants therein. Wetting action is provided by means of a spray manifold 70 having a plurality of nozzles 72 arranged to direct sprays of finely directed liquid mist into the gas as it passes through the flow constricting device 50 in the inlet chamber. Scrubbing liquid for this purpose is supplied from an inlet line 74 from a suitable source. The flow constriction assembly is operable to adjustably control the maximum velocity range of the gas as it passes in a generally vertical direction through the inlet chamber 46 which is defined between the vertical housing front wall 24, the divider wall 40, and forward portions of the sidewalls 22. The flow constrictor comprises a plurality of elongated filter elements or grids, such as the cylindrical rods 52 and 54. These rods extend transversely across the downward flow path of the gas in the inlet chamber 46 in a direction generally perpendicular to the divider wall 40 in a horizontal direction. A lower set of filter elements 52 is arranged with the rods in a horizontal plane in spaced-apart, parallel relation, and each rod is supported at opposite ends for free axial rotation by a pair of side angles 56 of a rectangular lower frame 55. The frame is fabricated of angle iron and includes end angles 58 extending transversely between the side angles 56 at opposite ends. The angles 56 and 58 include outwardly extending horizontal flanges which flanges are welded or otherwise secured to the facing inside parallel surfaces of the front wall 24 and the divided wall 40, and forward portions of the opposing sidewalls 22 which define the inlet chamber 46.

As best shown in FIG. 4, the side angles 56 include upstanding vertical flanges having horizontally aligned, spaced-apart apertures 56a of circular shape for freely receiving the outer end portions of the cylindrical filter elements or rods 52 in the lower set. As the gas flow passes between the elements, friction forces acting on the element surfaces may cause axial rotation in a random manner. In addition to the spaced-apart circular apertures 56a, the upstanding vertical flanges of the side angles 56 are provided with alternate upwardly opening slots 56b positioned between adjacent pairs of the circular apertures 56a. The slots 56b receive and vertically guide the filter elements or rods 54 in the upper or movable set. The slots 56b are open along the upper edge of the vertical flanges of the angles 56 and permit the rods 54 to move freely in a vertical direction within the slots. Opposite, vertical sides of each slot provide a restraining vertical guide for an end of a rod element 54 and limits the horizontal traverse thereof while permitting free vertical traverse.

The rod elements 54 in the upper set are supported in horizontal, spaced, parallel relation to one another for movement in unison toward and away from the lower set of rod elements 52 which are carried by the fixed frame 55. For this purpose, a rectangular frame 80, formed of longitudinal side members 82 and transverse cross members 84 at opposite ends is movably mounted above the fixed frame. The rod elements 54 are supported in the upper movable frame 80 adjacent their opposite ends from the longitudinal side members 82 by means of short stub axles 54a which extend into elongated horizontal slots 82a provided in the side members.

As best shown in FIG. 4, the elongated horizontal slots 82a permit limited horizontal movement of the upper rod elements 54 relative to the movable frame 80 while limiting any vertical relative movement of the rod elements 54 with respect thereto. Accordingly, upper and lower surfaces of each of the slots 82a provide opposite horizontal guide surfaces for the rod elements as the movable frame 80 is adjusted up and down relative to the fixed frame 55, which is fixedly positioned relative to the walls of the scrubber housing. The lower, fixed frame 55 and the upper, movable frame 80 are interconnected by means of a plurality of short pivot links 86 having their lower ends pivotally connected to the side angles 56 by means of pivot bolts 88. The lower pivot bolts are supported on small upstanding brackets 90 secured to the horizongal flanges of the angles 56. The upper ends of the pivot links are pivotally secured to the side members 82 of the upper, movable frame 80 by means of pivot bolts 92. The pivot links 86 provide positive structural interconnection between the fixed, lower frame 55 and the movable, upper frame 80 so that the upper set of filter rods 54 may move in a controlled and limited manner toward and away from the lower set of filter rods 52. During adjustment of the relative position between the upper and lower frame, the upper rods 54 are always maintained in substantially equilateral spacing in a horizontal sense relative to the adjacent pair of elements 52 in the lower support frame 55. This is accomplished by means of the vertical guide surfaces of the slots 56b in the lower side angles 56. In addition, all of the rods 54 are maintained along the same horizontal level by guiding the upper and lower surfaces of the elongated slots 82a in the side members 82 of the movable frame 80. Any selected, spaced interval between the rods 52 and 54 between a minimum and maximum can be obtained and set by adjustment of the angle of slope of the pivot links 86. A precise spacing distance "D" (FIG. 4) between each pair of elements 52 and 54 is selected and, correspondingly, a maximum velocity, as represented by the arrows "V," results. The spacing distance "D" sets up the effective, cross-sectional flow area for the gas through the flow constrictor 50 and thus achieves any desired maximum velocity range needed for effective scrubbing action.

Figure 2:
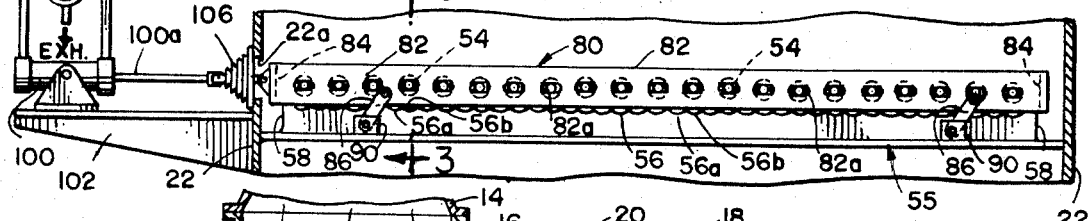
FIG. 2 is a fragmentary, vertical, cross-sectional view looking in the direction of the arrows 2—2 of FIG. 1.

When a minimum flow volume input of gases is directed into the scrubber housing, the movable frame 80 is positioned downwardly relative to the fixed frame 55 and the upper set of rod elements 54 may rest at the lower ends of the receiving slots 56b of the side frame angles 56. In this position, a minimal cross-sectional flow area is presented to the gases and the velocity of the gas is thus maintained at a maximum value even though the flow rate of gas input into the scrubber is minimal. As the flow rate increases, the frame 80 may be raised upwardly and the upper rods 54, correspondingly, are moved in unison upwardly in the vertical slots 56b toward a maximum level position, as shown in FIG. 4, providing a maximum flow area for the gas. Interconnection between the movable frame 80 and the fixed frame 55 provides for a continuous, parallel arrangement between the alternate rod elements 54 and 52 in any selected intermediate position of the upper frame 80 above the fixed frame 55. In order to set and maintain any selected position of the upper, movable frame 80 with respect to the lower, fixed frame 55, a control and holding means, such as a double acting fluid cylinder 100, is provided. The fluid cylinder is supported on a bracket 102 and a piston rod 100a thereof is pivotally interconnected at its outer end to one of the end cross members 82 of the upper movable frame 80, as best shown in FIG. 2. By varying the position of the fluid piston within the fluid cylinder 100, the angle of slope of the parallel pivot links 86 is adjustable and, accordingly, the relative spacing between the rod elements 54 and 52 is selected and maintained. Pressurized fluid is selectively introduced into opposite ends of the fluid cylinder 100 by a control valve 104 (shown schematically in FIG. 2), and the valve is operable to connect one or the other ends of the cylinder with a suitable source of pressurized fluid. After selected spacing distance "D" is set up, the valve is moved to a neutral position wherein fluid on opposite sides of the piston in the fluid cylinder is trapped to hold the amount of extension of the rod 100a at a constant value.

From the foregoing, it will be seen that effective cross-sectional flow area presented to the gas as it is wetted from the nozzles 72 is selectively adjustable by movement of the upper frame 80 which carries an upper set of elongated filter elements 54. Once adjusted as desired, the relative spacing between elements 54 and 52 is maintained by means such as the fluid cylinder 100, as described.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A gas scrubber for removing contaminants from gas including a constrictive flow passage for said gas; a plurality of elongated filter elements in parallel extended transversely across said passage defining a plurality of separate, discrete flow paths for high velocity gas flow; a first set of said elements mounted in fixed relation to said flow passage; a second set of said elements comprising alternate ones between adjacent elements in said first set; support means carrying said second set of elements and mounted for movement relative to said flow passage toward and away from elements in said first set to vary the area of said flow paths; and holding means for positioning said support means for maintaining said second set of elements in a selected spaced relation with respect to said elements of said first set.

2. The gas scrubber of claim 1 wherein said support means includes pairs of guide surfaces between said elements in said first set for limiting movement of said elements of said second set to maintain substantially equal spacing between an element of said second set and each element in an adjacent pair of elements in said first set.

3. The gas scrubber of claim 2 wherein said support means includes a movable frame supporting said elements of said second set from opposite ends, and means mounting said frame for movement toward and away from said elements of said first set with said elements supported by said frame disposed between said guide surfaces.

4. The gas scrubber of claim 3 including pivot link means connected to said movable frame for supporting the same for parallel movement toward and away from the elements in said first set.

5. The gas scrubber of claim 4 wherein said pivot link means are pivotable about axes fixed relative to said elements in said first set.

6. The gas scrubber of claim 4 including a fixed frame supporting said elements of said first set, said pivot link means pivotally interconnected between said fixed and movable frames.

7. The gas scrubber of claim 4 wherein said holding means is operatively interconnected to adjust and hold the relative pivotal position of said pivot link means and said movable frame to provide said selected spaced relation between said elements of said first and second sets.

8. The gas scrubber or claim 7 wherein said holding means comprises force exerting means of adjustable length.

9. The gas scrubber of claim 3 including a fixed frame supporting said first elements from opposite ends thereof, said fixed frame including means defining said guide surfaces therein.

10. The gas scrubber of claim 9 wherein said elements of said first set are supported for free axial rotation in said fixed frame and said elements of said second set are supported for free axial rotation in said movable frame.

11. The gas scrubber of claim 10 wherein said movable frame includes a plurality of guides defined thereby supporting opposite ends of said elements carried thereby and permitting limited translation of said elements normal to their own longitudinal axes.

12. The gas scrubber of claim 11 wherein said guide surfaces of said fixed frame are angularly disposed relative to said guides of said movable frame.

* * * * *